US008839626B2

(12) United States Patent
Saitou et al.

(10) Patent No.: US 8,839,626 B2
(45) Date of Patent: Sep. 23, 2014

(54) GAS TURBINE COMBUSTOR INCLUDING A TRANSITION PIECE FLOW SLEEVE WRAPPED ON AN OUTSIDE SURFACE OF A TRANSITION PIECE

(75) Inventors: Takeo Saitou, Hitachinaka (JP); Yasuyuki Watanabe, Hitachi (JP); Shouhei Yoshida, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 242 days.

(21) Appl. No.: 13/252,262

(22) Filed: Oct. 4, 2011

(65) Prior Publication Data

US 2012/0079828 A1 Apr. 5, 2012

(30) Foreign Application Priority Data

Oct. 5, 2010 (JP) ................................. 2010-225391

(51) Int. Cl.

*F02C 1/00* (2006.01)
*F02G 3/00* (2006.01)
*F23R 3/04* (2006.01)
*F01D 9/02* (2006.01)

(52) U.S. Cl.

CPC ......... *F23R 3/04* (2013.01); *F23R 2900/03044* (2013.01); *F05D 2260/201* (2013.01); *F01D 9/023* (2013.01)
USPC ................... 60/752; 60/753; 60/754; 60/755; 60/756; 60/757; 60/758; 60/759; 60/760

(58) Field of Classification Search

USPC .................................................... 60/752–760
See application file for complete search history.

(56) References Cited

U.S. PATENT DOCUMENTS

| | | | | |
|---|---|---|---|---|
| 3,652,181 | A * | 3/1972 | Wilhelm, Jr. | 415/117 |
| 4,872,312 | A | 10/1989 | Iizuka et al. | |
| 6,412,268 | B1 | 7/2002 | Cromer et al. | |
| 7,310,938 | B2 * | 12/2007 | Marcum et al. | 60/39.37 |
| 7,827,801 | B2 * | 11/2010 | Dawson et al. | 60/759 |
| 8,051,662 | B2 * | 11/2011 | Figueroa et al. | 60/752 |
| 2003/0106318 | A1 * | 6/2003 | Leahy, Jr. | 60/722 |
| 2007/0180827 | A1 | 8/2007 | Dawson et al. | |
| 2010/0071382 | A1 * | 3/2010 | Liang | 60/806 |
| 2010/0199677 | A1 | 8/2010 | Figueroa et al. | |

FOREIGN PATENT DOCUMENTS

| | | | |
|---|---|---|---|
| JP | 62-218732 | A | 9/1987 |
| JP | 7-52014 | B2 | 6/1995 |
| JP | 2001-289061 | A | 10/2001 |

OTHER PUBLICATIONS

Extended European Search Report dated May 3, 2012 (eight (8) pages).

* cited by examiner

*Primary Examiner* — Craig Kim
(74) *Attorney, Agent, or Firm* — Crowell & Moring LLP

(57) ABSTRACT

A gas turbine combustor comprising a fuel nozzle for injecting mixed gas of fuel and air, a cylindrical liner for burning and reacting the mixed gas of fuel and air in a combustion chamber, a transition piece which is a flow path for leading combustion gas generated in the liner to turbine blades, and a transition piece flow sleeve for wrapping an outside surface of the transition piece, wherein a plurality of air introduction holes for introducing air into the transition piece flow sleeve are formed in regions of the transition piece flow sleeve excluding regions which are corner portions of the transition piece flow sleeve in a sectional direction thereof.

3 Claims, 8 Drawing Sheets

GAS TURBINE COMBUSTOR INCLUDING A TRANSITION PIECE FLOW SLEEVE WRAPPED ON AN OUTSIDE SURFACE OF A TRANSITION PIECE

CLAIM OF PRIORITY

The present application claims priority from Japanese patent application JP 2010-225391 filed on Oct. 5, 2010, the content of which is hereby incorporated by reference into this application.

BACKGROUND OF THE INVENTION

1. Field of the Invention

The present invention relates to a gas turbine combustor and more particularly to a structure of a gas turbine combustor intending to improve the reliability and cooling property of a transition piece for leading combustion gas generated in a combustion chamber of the gas turbine combustor to the turbine blades.

2. Description of Related Art

The transition piece composing the gas turbine combustor is a flow path for leading high-temperature and high-pressure combustion gas generated by an oxidation reaction of fuel and air in the combustion chamber of the gas turbine combustor to the turbine blades.

The transition piece of the gas turbine combustor is a duct having an entrance portion in a circular shape on the side of the combustion chamber and an exit portion in a fan shape on the side of the turbine blades and therein, high-temperature combustion gas at 1300° C. or higher flows at high speed, so that it is necessary to install some cooling facility to reduce the temperature of the member composing the transition piece to the allowable temperature or lower.

As one of the means for cooling the transition piece of the gas turbine combustor, as disclosed in Japanese Patent Laid-open No. 2001-289061, impingement cooling for cooling the transition piece by covering the whole surface of the transition piece of the gas turbine combustor with a transition piece flow sleeve and permitting an air current injected from many air holes formed in the transition piece flow sleeve to collide with the transition piece may be cited.

Further, as another one of the means for cooling the transition piece of the gas turbine combustor, as disclosed in Japanese Patent publication No. Hei 7 (1995)-52014, there is a method for cooling the end portion of the transition piece of the gas turbine combustor by covering the transition piece of the gas turbine combustor with the transition piece flow sleeve, executing the impingement cooling for the downstream side of the transition piece and convection cooling for the upstream side of the transition piece through convection cooling holes, and permitting cooling air to flow to the end of the transition piece flow sleeve on the turbine side.

DOCUMENT OF PRIOR ART

Patent Document 1: Japanese Patent Laid-open No. 2001-289061

Patent Document 2: Japanese Patent Publication No. Hei 7 (1995)-52014

SUMMARY OF THE INVENTION

In the cooling structure of the transition piece of the gas turbine combustor disclosed in Japanese Patent Laid-open No. 2001-289061, many air holes are formed over the entire surface of the transition piece flow sleeve for surrounding the transition piece. Further, also in the cooling structure of the transition piece of the gas turbine combustor disclosed in Japanese Patent Publication No. Hei 7 (1995)-52014, many air holes are formed over the entire surface of the downstream portion of the transition piece flow sleeve.

Here, a general manufacturing method of the transition piece flow sleeve with air holes formed will be explained. The transition piece flow sleeve is manufactured by performing a boring process of many air holes for a flat sheet of a raw material and then press-molding it.

However, the section of the exit portion of the transition piece flow sleeve is fan-shaped, so that the corner portion of the exit portion of the transition piece flow sleeve is bent at an angle of 90° or more. Therefore, a problem arises that at the time of press molding, the air holes formed in the corner portion of the transition piece flow sleeve are stretched and deformed. And, when the deformation amount of the air holes is large, there is a possibility that the surroundings of the air holes may be cracked.

Further, when the gas turbine is in operation, the air pressure outside the transition piece flow sleeve is higher than that inside the flow sleeve, so that due to the pressure difference between the inside and the outside, force is acted in the direction for compressing the transition piece flow sleeve toward the inside from the outside. At this time, particularly in the corner portion of the transition piece flow sleeve, stress is concentrated. Therefore, if air holes are formed in the corner portion of the transition piece flow sleeve, the strength of the surrounding member of the corner portion of the transition piece flow sleeve is reduced, thus there is a possibility that due to the stress in operation, there is a possibility that the main unit of the transition piece flow sleeve may be deformed.

Furthermore, the transition piece is impingement-cooled by air injected from the air holes of the transition piece flow sleeve, though when air holes are formed in the corner portion of the transition piece flow sleeve, the cooling air injected from the air holes of the corner portion toward the transition piece flows on both sides along the corner portion of the transition piece. This air current is called a cross flow and it may be considered that the air current weakens the effect of collision of the jet flow injected from the air holes in the vicinity of the corner portion to the transition piece and reduces the impingement cooling property.

An object of the present invention is to provide a gas turbine combustor for suppressing the occurrence of deformation and cracking in the transition piece flow sleeve of the gas turbine combustor and intending to improve the reliability of the transition piece flow sleeve and improve the cooling property of the transition piece.

A gas turbine combustor of the present invention, comprising a fuel nozzle for injecting mixed gas of fuel and air, a cylindrical liner for burning and reacting the mixed gas of fuel and air in the combustion chamber, a transition piece which is a flow path for leading combustion gas generated in the liner to the turbine blades, and a transition piece flow sleeve for wrapping the outside surface of the transition piece, wherein a plurality of air introduction holes for introducing air into the transition piece flow sleeve are formed in the region of the transition piece flow sleeve excluding the region which is the corner portion of the transition piece flow sleeve in the sectional direction thereof.

Also, a gas turbine combustor of the present invention, comprising a fuel nozzle for injecting mixed gas of fuel and air, a cylindrical liner for burning and reacting the mixed gas of fuel and air in the combustion chamber, the transition piece which is a flow path for leading combustion gas generated in the liner to the turbine blades, and a transition piece flow sleeve for wrapping the outside surface of the transition piece, wherein a plurality of first air introduction holes are formed in regions which are corner portions of the transition piece flow sleeve in a sectional direction thereof, a plurality of second air introduction holes are formed in regions of the transition piece flow sleeve excluding the regions which are the corner portions of the transition piece flow sleeve, and a diameter of the first air introduction holes formed in the region of the corner portion of the section of the transition piece flow sleeve is made smaller than a diameter of the second air introduction holes formed in the region of the transition piece flow sleeve excluding the regions of the corner portions.

According to the present invention, a gas turbine combustor for suppressing the occurrence of deformation and cracking in the transition piece flow sleeve of the gas turbine combustor and intending to improve the reliability of the transition piece flow sleeve and improve the cooling property of the transition piece can be realized.

DETAILED DESCRIPTION OF THE INVENTION

The gas turbine combustor that is an embodiment of the present invention will be explained below with reference to the accompanying drawings.

Embodiment 1

The gas turbine combustor that is the first embodiment of the present invention will be explained below by referring to FIGS. 1 to 4.

Figure 1:
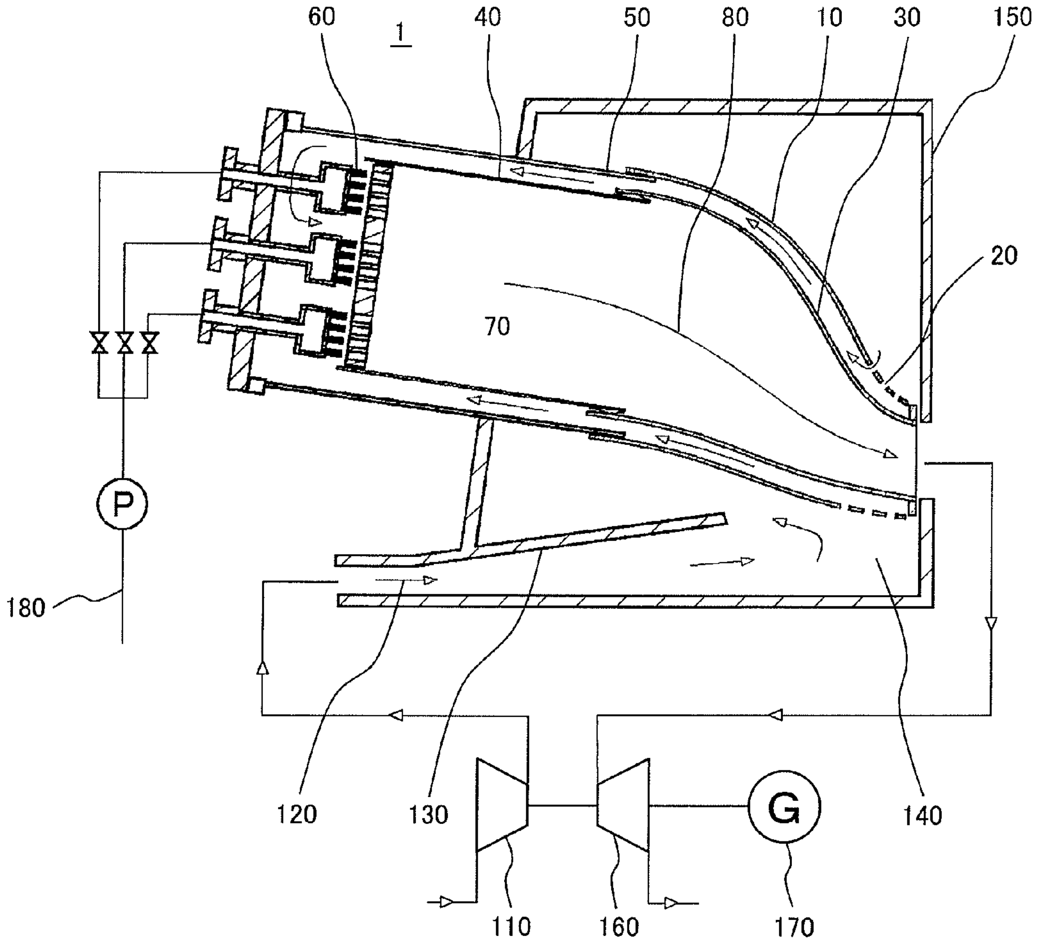
FIG. 1 is a schematic diagram showing the constitution of the gas turbine to which the gas turbine combustor of the present invention is applied.

FIG. 1 is a schematic diagram showing the constitution of the gas turbine unit to which a gas turbine combustor 1 of the first embodiment of the present invention is applied. As shown in FIG. 1, high-pressure air 120 compressed and introduced by an air compressor 110 is introduced into a plenum chamber 140 via a diffuser 130 and flows into the gap between a transition piece 30 and a transition piece flow sleeve 10 from air introduction holes 20 formed in the transition piece flow sleeve 10 composing the gas turbine combustor 1.

The high-pressure air 120 flowing into the gap between the transition piece 30 and the transition piece flow sleeve 10 flows through the gap between a liner 40 and a liner flow sleeve 50 arranged on the concentric circle on the outer periphery of the liner, then reverses the flow, is mixed with fuel injected from fuel nozzles 60, is injected into a combustion chamber 70, burns in the combustion chamber 70 formed inside the liner 40, forms a flame, and thereby becomes high-temperature and high-pressure combustion gas 80.

The combustion gas 80 generated in the combustion chamber 70 of the gas turbine combustor 1 flows down in the transition piece 30 and is introduced into a turbine 160. The gas turbine unit converts the workload generated when the high-temperature and high-pressure combustion gas 80 expands adiabatically to the shaft rotation force by the turbine 160, and thereby obtains output from a generator 170 connected to the turbine 160.

The air compressor 110 and the generator 170 are connected to the turbine 160 with one shaft. However, the air compressor 110, the turbine 160, and the generator 170 may be structured so as to connect to each other with two or more shafts. Further, generally, the gas turbine unit widely used in a thermal power plant adopts a constitution that for the rotary shaft of the turbine, the gas turbine combustor 1 is arranged radially in the form of a plurality of cans.

The gas turbine combustor 1 which is the first embodiment of the present invention will be explained in more detail by referring to FIGS. 2 to 4.

Figure 2:
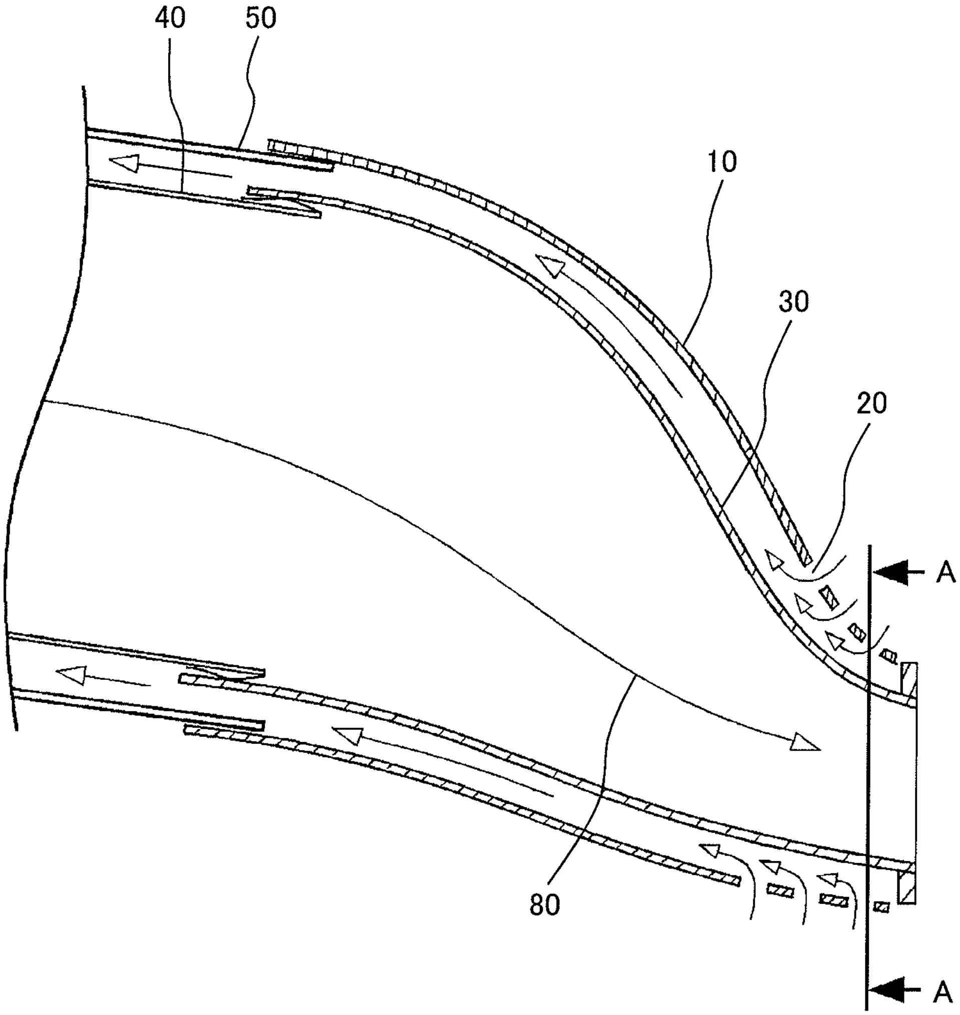
FIG. 2 is a partial cross sectional view showing the structure of the transition piece of the gas turbine combustor that is the first embodiment of the present invention.
Figure 3:
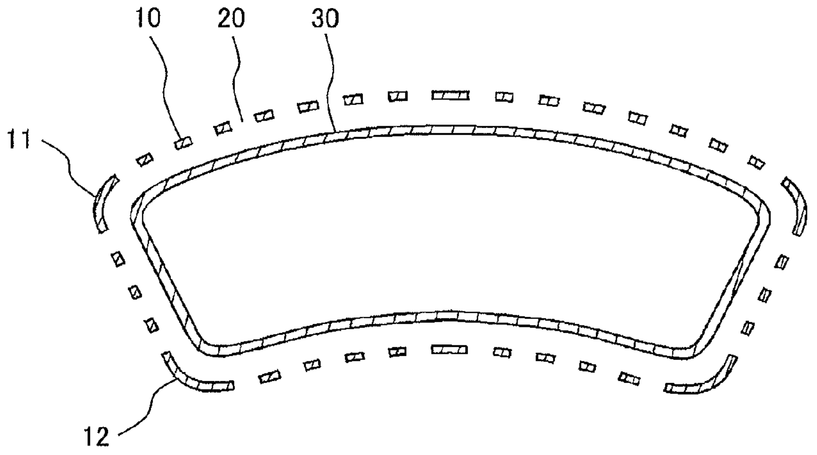
FIG. 3 is a cross sectional view taken along the line A-A of the transition piece of the gas turbine combustor of the first embodiment shown in FIG. 2.
Figure 4:
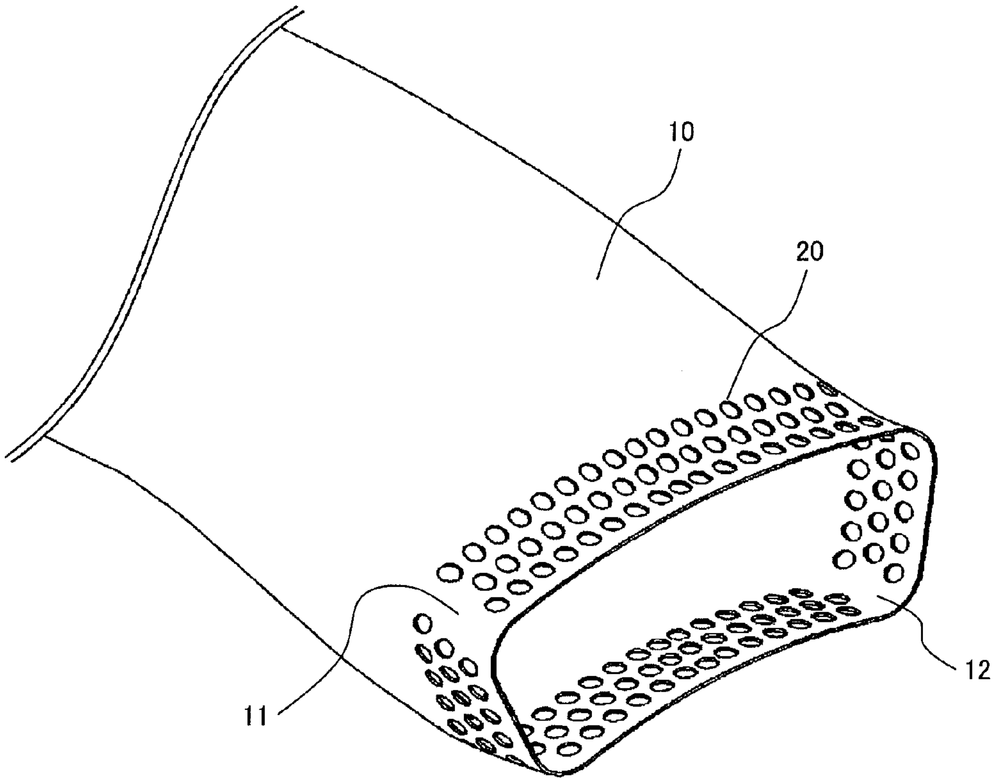
FIG. 4 is a partial diagram showing only the transition piece flow sleeve of the gas turbine combustor of the first embodiment of the present invention shown in FIG. 2.

The structure of the gas turbine combustor 1 of this embodiment shown in FIGS. 2 to 4 is composed of the cylindrical liner 40 for internally forming the combustion chamber 70 of the gas turbine combustor 1, the cylindrical liner flow sleeve 50 arranged on the concentric circle with the liner on the outer periphery side of the liner 40, the transition piece 30 installed on the downstream side of the liner 40, the transition piece flow sleeve 10 for covering the transition piece 30 at a predetermined flow path interval from the transition piece 30, and the plurality of air holes 20 formed in the transition piece flow sleeve 10.

The air discharged from the air compressor 110 is introduced from the air holes 20 formed in the transition piece flow sleeve 10, and the jet flow thereof collides with the transition piece 30, thereby impingement-cooling the downstream portion of the transition piece 30 exposed to the high-temperature combustion gas 80 generated in the combustion chamber 70 of the gas turbine combustor 1. The air impingement-cooling the downstream portion of the transition piece 30, thereafter, flows around the transition piece 30 at high speed, thereby convection-cooling the main unit of the transition piece 30.

The characteristic of the structure of the gas turbine combustor 1 of this embodiment is that, as shown in FIGS. 2 to 4, the air holes 20 formed in the transition piece flow sleeve 10 are formed over the entire region of the transition piece flow sleeve 10 excluding corner portions 11 and 12 of the transition piece flow sleeve 10.

FIG. 4 is an external view of the exit portion in the single state of the transition piece flow sleeve 10 of the gas turbine combustor 1 of this embodiment, showing the state that the plurality of air holes 20 are formed over the entire region of the transition piece flow sleeve 10 excluding the corner portions 11 and 12 of the transition piece flow sleeve 10.

On the other hand, when manufacturing the transition piece flow sleeve 10 of the gas turbine combustor 1, generally, the transition piece flow sleeve 10 is manufactured by pressing and molding a flat sheet of a raw material, though when forming the air holes 20 in the transition piece flow sleeve 10, it is said that a method for performing a boring process at the stage of a flat sheet of a raw material is good.

As a methodology, there is a measure available for press molding the transition piece flow sleeve 10 and then performing a boring process of the air holes 20, though for that purpose, a boring machine operating three-dimensionally is necessary and time is required to set the position and angle for boring, so that not only the boring time becomes longer but also the boring cost is increased. Furthermore, when performing the boring process of the air holes 20, to keep the transition piece flow sleeve 10 in an undeformed three-dimensional shape, the necessity of installing a reinforcing member on the transition piece flow sleeve 10 may be considered.

For the aforementioned reason, to realize shortening of the boring time at a low cost, it is said that a method for performing the boring process of the air holes 20 at the stage of a flat sheet of a raw material of the transition piece flow sleeve 10 and press molding it is good.

However, the transition piece 30 and the transition piece flow sleeve 10 have a circular entrance portion and a fan-shaped exit portion and at the four corner portions of the exit portion, the two units are bent at an angle of almost 90°. When press molding the flat sheet, at the bending portion, force is applied in the pulling direction of the raw material sheet, so that a problem arises that when pressing the bored flat sheet, the air holes 20 formed at the corner portions of the transition piece flow sleeve 10 are stretched and deformed. At this time, when the deformation amount is large, there is a possibility that the surroundings of the air holes may be cracked.

Furthermore, when the gas turbine unit is in operation, the air pressure outside the transition piece flow sleeve 10 is higher than that inside the transition piece flow sleeve 10, so that due to the pressure difference between the inside and the outside, force is acted in the direction for compressing the transition piece flow sleeve 10 toward the inside from the outside. At this time, particularly in the corner portions 11 and 12 of the transition piece flow sleeve 10, stress is concentrated.

Figure 5:
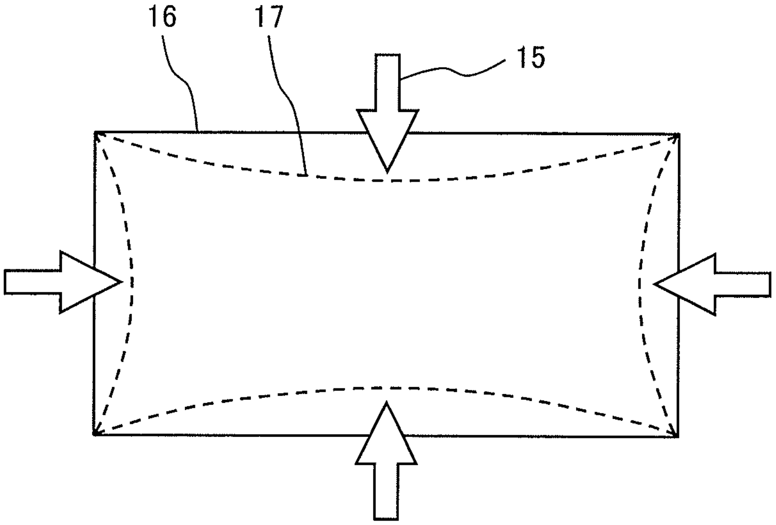
FIG. 5 is a schematic diagram showing the outline of deformation of a hollow article in a rectangular parallelepiped shape when pressure is applied from the outside.
Figure 6:
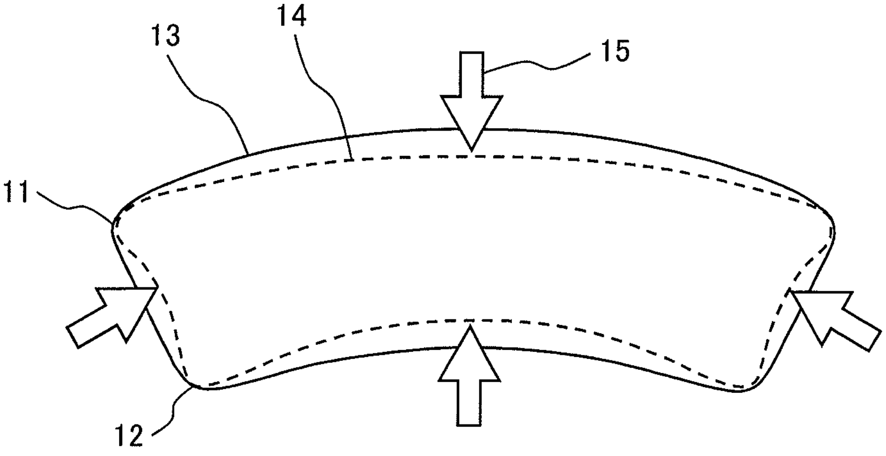
FIG. 6 is a schematic diagram showing the outline of deformation of the transition piece flow sleeve of the gas turbine combustor when pressure is applied from the outside.

The reason that the stress is concentrated in the corner portions 11 and 12 of the transition piece flow sleeve 10 will be explained by referring to the schematic diagrams of FIGS. 5 and 6. As shown in FIG. 5, generally, if an article 16 in a rectangular parallelepiped shape is applied pressure 15 from the surroundings, it is deformed as shown by a line 17. At this time, the deformation amounts of the four peak portions (corner portions) are large, so that large stress is applied to the corner portions. The same may be said with the transition piece flow sleeve 10 of the gas turbine combustor 1 and as shown in FIG. 6, if the pressure 15 is applied from the outside of the transition piece flow sleeve 10, an outside surface line 13 of the transition piece flow sleeve 10 indicated by a solid line is deformed like an outside surface line 14 indicated by a dashed line and large stress in the bending direction is applied to the corner portions 11 and 12 of the transition piece flow sleeve 10.

Therefore, when air holes are formed in the corner portions 11 and 12 of the transition piece flow sleeve 10, the strength of the surrounding members of the corner portions 11 and 12 is reduced, thus due to the stress caused by the pressure difference between the inside and the outside when the gas turbine unit is in operation, there is a possibility that the main unit of the transition piece flow sleeve 10 may have large plastic deformation.

Therefore, in the transition piece flow sleeve 10 of the gas turbine combustor 1 of this embodiment, with reference to the air holes 20 formed in the transition piece flow sleeve 10, a plurality of air holes are arranged over the entire region of the transition piece flow sleeve 10 excluding the region of the corner portions 11 and 12 of the transition piece flow sleeve 10, thus at the time of manufacture of the transition piece flow sleeve 10, the occurrence of air holes 20 deformation and cracking can be avoided and the deformation of the transition piece flow sleeve 10 when the gas turbine unit is in operation can be prevented.

Figure 7:
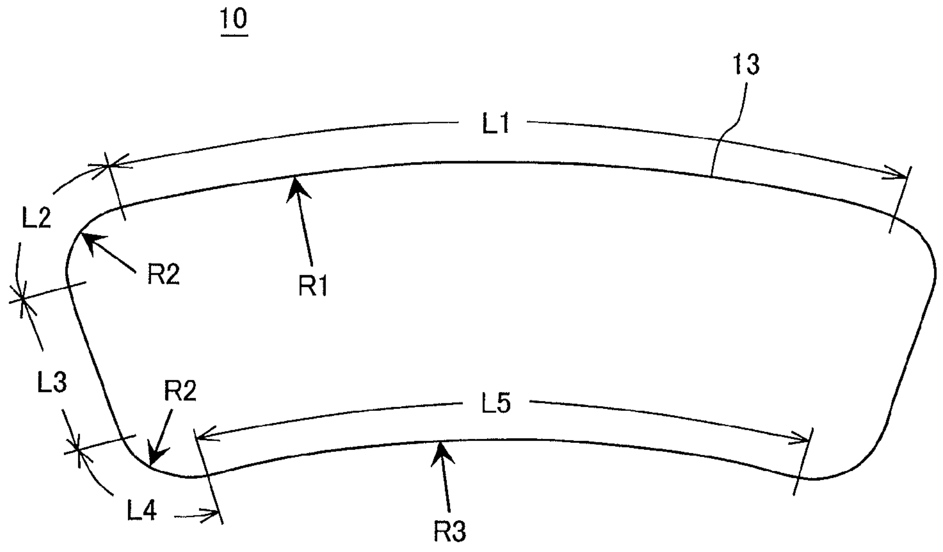
FIG. 7 is a schematic diagram of the transition piece flow sleeve with the curvature of the outside surface portion of the transition piece flow sleeve specified showing the form of the transition piece flow sleeve of the gas turbine combustor which is an embodiment of the present invention.
Figure 8:
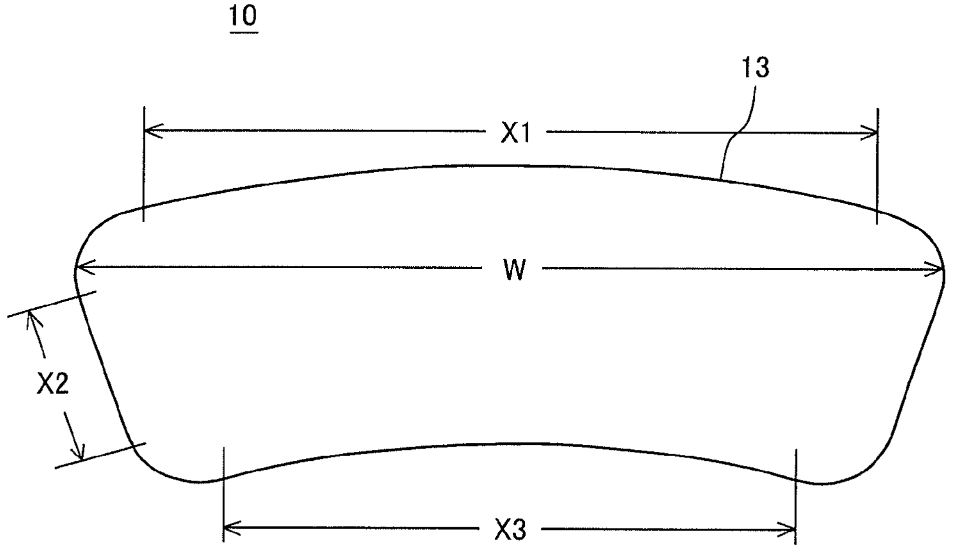
FIG. 8 is a schematic diagram of the transition piece flow sleeve with the width of the transition piece flow sleeve specified showing the form of the transition piece flow sleeve of the gas turbine combustor which is an embodiment of the present invention.

The installation region of the air holes 20 in the transition piece flow sleeve 10 of the gas turbine combustor 1 of this embodiment will be explained by referring to FIGS. 7 and 8. In FIGS. 7 and 8, the outside surface line 13 in the section of the exit portion of the transition piece flow sleeve 10 is shown.

As shown in FIG. 7, the transition piece flow sleeve 10 is formed by regions of a plurality of radii of curvature where the respective radii of curvature for specifying the external form of the transition piece flow sleeve 10 are different from each other. In the transition piece flow sleeve 10 shown in FIG. 7, the regions are respectively formed assuming the radius of curvature within the range of L1 on the back side which is the upper side of the transition piece flow sleeve 10 (hereinafter, indicated as the back side) as R1, the radius of curvature within the range of L5 on the abdomen side which is the lower side of the transition piece flow sleeve 10 (hereinafter, indicated as the abdomen side) as R3, the radius of curvature within the range of L2 in the back side corner portion which is the interval between the back side and the side of the transition piece flow sleeve 10 as R2, and the radius of curvature within the range of L4 in the abdomen side corner portion which is the interval between the abdomen side and the side of the transition piece flow sleeve 10 as R2.

As a range of forming the air holes 20 in the transition piece flow sleeve 10 shown in the gas turbine combustor 1 of this embodiment, among a plurality of regions for specifying the form of the outside surface portion of the transition piece flow sleeve 10 by different values of radii of curvature, it is desirable to form the air holes 20 in a region excluding regions where the values of the radii of curvature are smaller than the radii of curvature in other regions.

Explaining the radii of curvature of different values for specifying the form of the outside surface portion of the transition piece flow sleeve 10 by referring to FIG. 7, in comparison of the radii of curvature R1, R2, and R3, R2 is smaller than R1 and R3, so that in the regions of L1, L3, and L5 of the transition piece flow sleeve 10 excluding the regions of L2 and L4 of R2, the plurality of air holes 20 are formed.

In addition to the aforementioned method due to the difference in the radius of curvature, as shown in FIG. 8, on the basis of the maximum width W of the transition piece flow sleeve 10, the installation region of the air holes 20 may be decided. For example, on the back side of the transition piece flow sleeve 10, in the region X1 of 80% or more of the maximum width W of the transition piece flow sleeve 10, on the abdomen side of the transition piece flow sleeve 10, in the region X3 of 60% or more of the maximum width W, and on both sides of the transition piece flow sleeve 10, in each of the regions X2 which are a straight line portion, a plurality of air holes 20 may be formed.

Further, in the gas turbine combustor 1 of this embodiment, not only the transition piece flow sleeve 10 can be suppressed from deformation and cracking but also the cooling property of the transition piece 30 can be improved.

Figure 9:
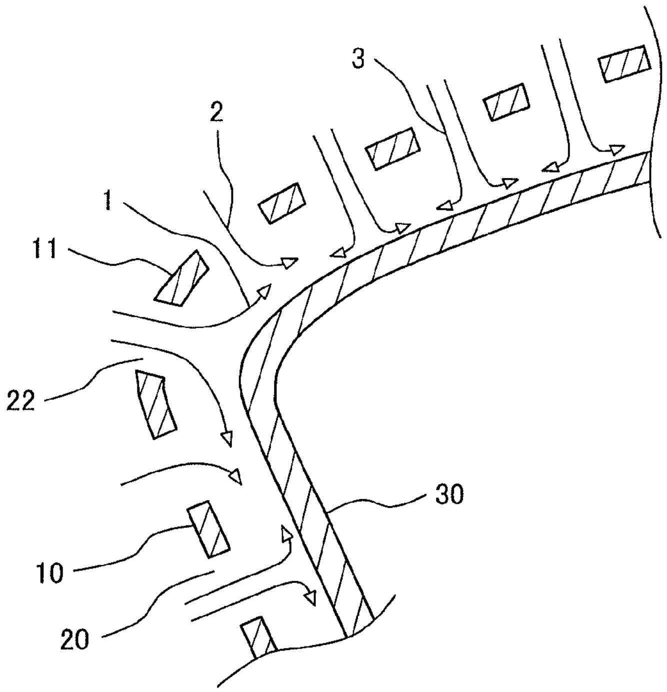
FIG. 9 is a schematic diagram showing the air current on the outside surface of the transition piece when air holes are formed in the corner portion showing the partial cross sectional view of the transition piece flow sleeve of the gas turbine combustor.
Figure 10:
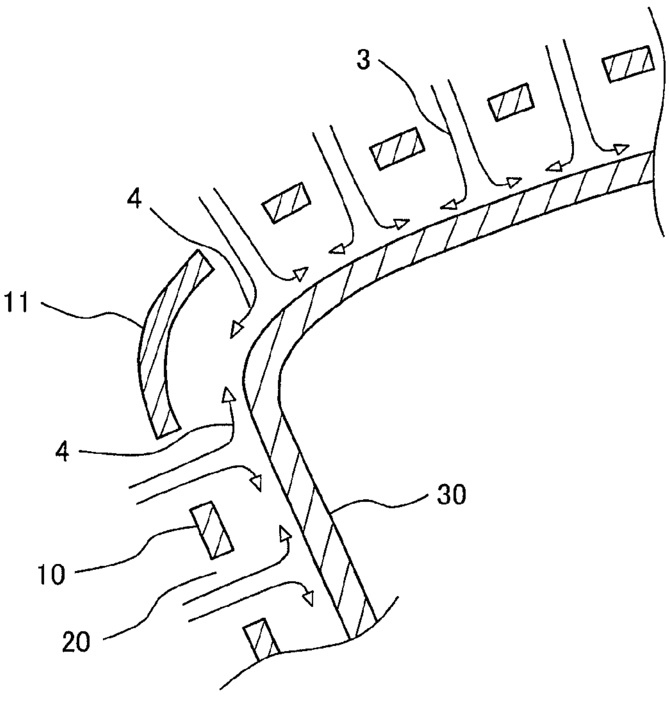
FIG. 10 is a schematic diagram showing the air current on the outside surface of the transition piece when no air holes are formed in the corner portion showing a partial cross sectional view of the transition piece flow sleeve of the gas turbine combustor which is the first embodiment and second embodiment of the present invention.

The schematic diagram of the air current on the outside surface of the transition piece 30 of the gas turbine combustor 1 of this embodiment is shown in FIGS. 9 and 10. FIGS. 9 and 10 are a drawing in which the vicinity of the corner portion 11 of the transition piece flow sleeve 10 shown in FIG. 3 is enlarged.

FIG. 9 shows the structure that in the corner portion of the transition piece flow sleeve 10 of the gas turbine combustor 1, air holes 22 are formed. In this structure, air 1 injected from the air holes 22 formed in the corner portion collides with the transition piece 30 in a right angle shape, then becomes a current flowing in the direction of jet flow 2 adjacent along the surface of the transition piece 30, and thereby obstructs the current of collision of the jet flow 2 with the surface of the transition piece 30.

Here, the transition piece 30 is impingement-cooled by air jet flow 3 from the plurality of air holes 20 formed, so that when the air jet flow does not collide with the outside surface of the transition piece 30, the impingement cooling property becomes worse. Such a current for obstructing the current of jet flow is generally referred to as cross flow and it is a cause of deterioration of the impingement cooling property.

Therefore, in the structure of the transition piece flow sleeve 10 shown in FIG. 9, in the periphery of the corner portion of the transition piece 30, the jet flow 3 hardly collides with the surface of the transition piece 30, so that deterioration of the impingement cooling property is a concern.

Therefore, the transition piece flow sleeve 10 of the gas turbine combustor 1 of this embodiment, as shown in FIG. 10, is structured so that no air holes are formed in the corner portions of the transition piece flow sleeve 10, and in the region of the transition piece flow sleeve 10 excluding the corner portions of the transition piece flow sleeve 10, the plurality of air holes 20 are formed, thus the occurrence of cross flow in the periphery of the corner portions of the transition piece flow sleeve 10 can be avoided, thereby the deterioration of the cooling property in the periphery of the corner portions of the transition piece 30 can be suppressed.

Further, also the corner portions of the transition piece 30 are convection-cooled by a large amount of high-speed air flowing in from the air holes 20 formed on both sides of the corner portions, so that the members of the transition piece 30 will not become high in temperature.

Further, no air holes are formed in the corner portions of the transition piece flow sleeve 10 and a plurality of air holes 20 are formed in all the regions of the transition piece flow sleeve 10 except the corner portions, thus a large amount of cooling air can be distributed to the transition piece flow sleeve 10 except the corner portions, so that the cooling property of the whole transition piece 30 is improved.

According to this embodiment, a gas turbine combustor for suppressing the occurrence of deformation and cracking in the transition piece flow sleeve of the gas turbine combustor and intending to improve the reliability of the transition piece flow sleeve and improve the cooling property of the transition piece can be realized.

Embodiment 2

Next, the gas turbine combustor 1 which is the second embodiment of the present invention will be explained by referring to FIGS. 11 to 13. The gas turbine combustor 1 which is the second embodiment of the present invention is the same in the basic constitution as for the gas turbine combustor 1 of the first embodiment shown in FIGS. 1 to 4, so that the explanation of the common constitution to the two is omitted and the different portions will be explained.

Figure 11:
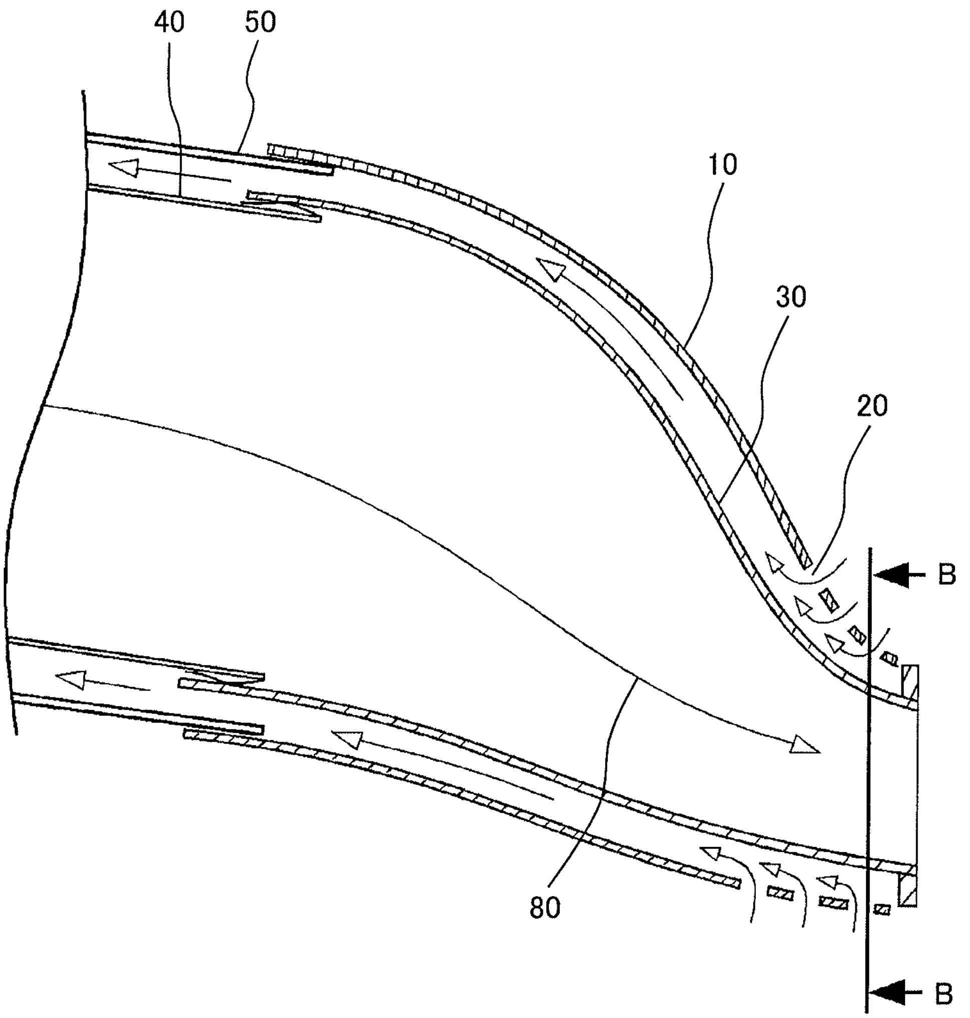
FIG. 11 is a partial cross sectional view showing the structure of the transition piece of the gas turbine combustor that is the second embodiment of the present invention.
Figure 12:
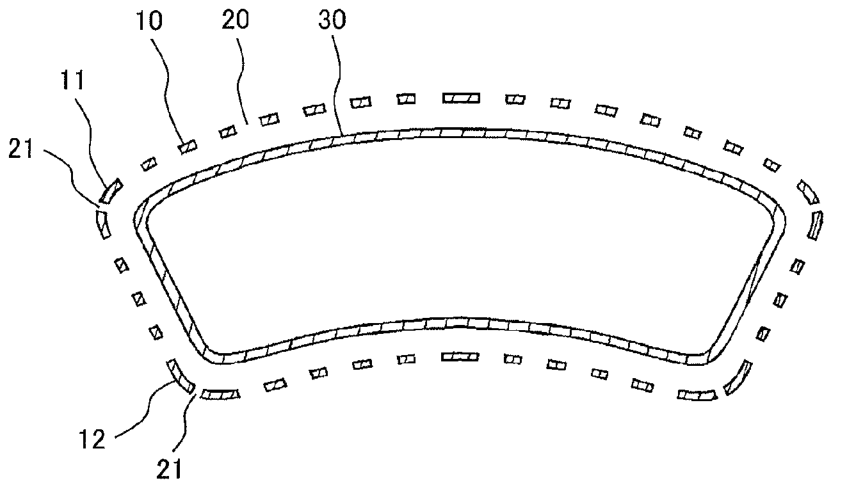
FIG. 12 is a cross sectional view taken along the line B-B of the transition piece of the gas turbine combustor of the second embodiment shown in FIG. 11.
Figure 13:
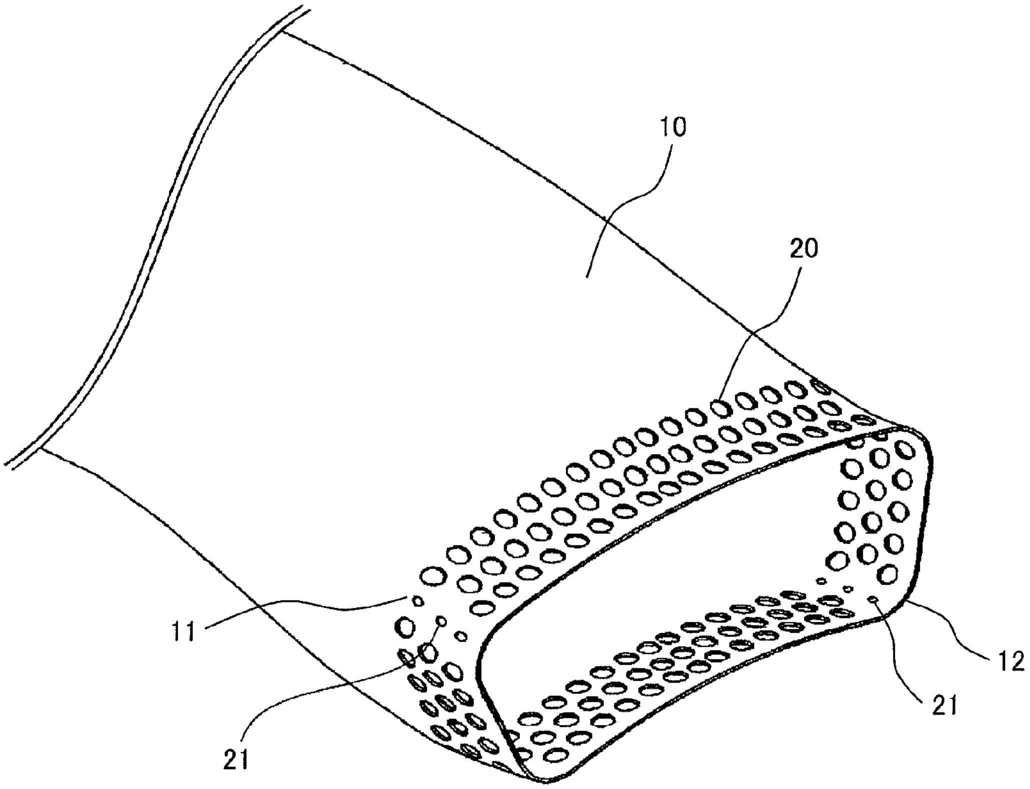
FIG. 13 is a partial diagram showing only the transition piece flow sleeve of the gas turbine combustor of the second embodiment shown in FIG. 11.

As shown in FIGS. 11 to 13, in the gas turbine combustor 1 of this embodiment, in the corner portions 11 and 12 of the transition piece flow sleeve 10, air holes 21 with a diameter smaller than that of the air holes 20 in other regions other than the corner portions 11 and 12 are formed.

FIG. 13 shows an external view of the exit portion in the single state of the transition piece flow sleeve 10, wherein the air holes 21 with a diameter smaller than that of the air holes 20 in other regions other than the corner portion 11 are formed.

The gas turbine combustor 1 of this embodiment shown in FIGS. 11 to 13 is a measure applied to a situation that due to a rise in the combustion gas temperature, the cooling property of the corner portions of the transition piece 30 needs to be improved more.

If air holes are formed in the corner portions 11 and 12 of the transition piece flow sleeve 10, deformation of the air holes at the time of press molding and deformation of the transition piece flow sleeve 10 due to reduction in the member strength when the gas turbine is in operation are a concern, though if the diameter of the air holes 21 is made smaller than that of the air holes 20, the aforementioned deformations are reduced to the greatest degree possible.

According to this embodiment, a gas turbine combustor for suppressing the occurrence of deformation and cracking in the transition piece flow sleeve of the gas turbine combustor and intending to improve the reliability of the transition piece flow sleeve and improve the cooling property of the transition piece can be realized.

The present invention can be applied to a gas turbine combustor having a transition piece flow sleeve in a transition piece of the combustor.

What is claimed is:

1. A gas turbine combustor comprising:

a fuel nozzle for injecting mixed gas of fuel and air, a cylindrical liner for burning and reacting the mixed gas of fuel and air in a combustion chamber, a liner flow sleeve arranged on the concentric circle with the liner on the outer periphery side of the liner, a transition piece which is a flow path for leading combustion gas generated in the liner to turbine blades, and a transition piece flow sleeve for wrapping an outside surface of the transition piece for flowing air through the gap between the liner and the liner flow sleeve, the transition piece flow sleeve having a portion surrounding an outlet portion of the transition piece, wherein the outlet portion of the transition piece has a plurality of corner portions, wherein a plurality of air introduction holes for introducing air into the transition piece flow sleeve are formed over the entire region portion of the transition piece flow sleeve excluding the corner portions of the transition piece flow sleeve in a sectional direction thereof.

2. The gas turbine combustor according to claim 1, wherein:

the corner portions are first regions having radii of curvature, among a plurality of regions having radii of curvature for specifying a form of an outside surface portion of the transition piece flow sleeve, and a value of each of the radii of curvature of the first regions is smaller than values of the radii of curvature of second and third regions for respectively specifying the forms of an upper side and a lower side of the outside surface portion of the transition piece flow sleeve.

3. The gas turbine combustor according to claim 1, wherein:

the regions of the transition piece flow sleeve excluding the regions of the corner portions where the air introduction holes are formed are, on the basis of a maximum width W of the transition piece flow sleeve, on a upper side of the transition piece flow sleeve, a region X1 of 80% or more of the maximum width W of the transition piece flow sleeve, on a lower side of the transition piece flow sleeve, a region X3 of 60% or more of the maximum width W, and on both sides of the transition piece flow sleeve, each of regions X2 which are straight line portions, and the air holes are formed respectively in the regions X1, X2, and X3.

* * * * *